United States Patent [19]
Abey

[11] 3,982,875
[45] Sept. 28, 1976

[54] APPARATUS FOR MAKING MOLDED ARTICLES OF EXPANDED CELLULAR MATERIAL AND PRODUCT THEREOF

[75] Inventor: John A. Abey, Salinas, Calif.

[73] Assignee: Bud Antle, Inc., Salinas, Calif.

[22] Filed: Jan. 12, 1976

[21] Appl. No.: 648,243

Related U.S. Application Data

[63] Continuation of Ser. No. 510,289, Sept. 30, 1974, abandoned.

[52] U.S. Cl. .............................. 425/444; 249/66 R; 425/DIG. 58
[51] Int. Cl.[2] ...................... B29C 7/00; B28B 7/10
[58] Field of Search .......... 425/438, 441, 317, 444, 425/249; 249/63, 64, 66, 68

[56] References Cited
UNITED STATES PATENTS

| | | | |
|---|---|---|---|
| 3,373,460 | 3/1968 | Ladney | 425/DIG. 58 |
| 3,642,417 | 2/1972 | Von Holdt | 425/444 X |

*Primary Examiner*—Francis S. Husar
*Assistant Examiner*—John S. Brown
*Attorney, Agent, or Firm*—Thomas H. Olson

[57] ABSTRACT

Complemental male and female mold sections are supported in spaced relation to define a cavity that has a molded corresponding to the shape of the article to be molded, the mold sections being relatively movable away from one another to afford ejection of a completed article. A recess in the surface of at least one of the mold sections in a wall thereof generally parallel to the direction of the mold separation. An ejector bar sized to fit within the recess, the ejector bar having a surface discontinuity that is the mirror image of a surface discontinuity to be formed on the wall of the molded article. Means for moving the ejector bar along an oblique path after the mold sections are separated so that the ejector bar performs the dual function of separating the molded article from the mold section and effecting disengagement between the surface discontinuity on the ejector bar and its mirror image on the molded part. A product having surface discontinuities on the side walls thereof that is constructed in accordance with the method and apparatus.

10 Claims, 12 Drawing Figures

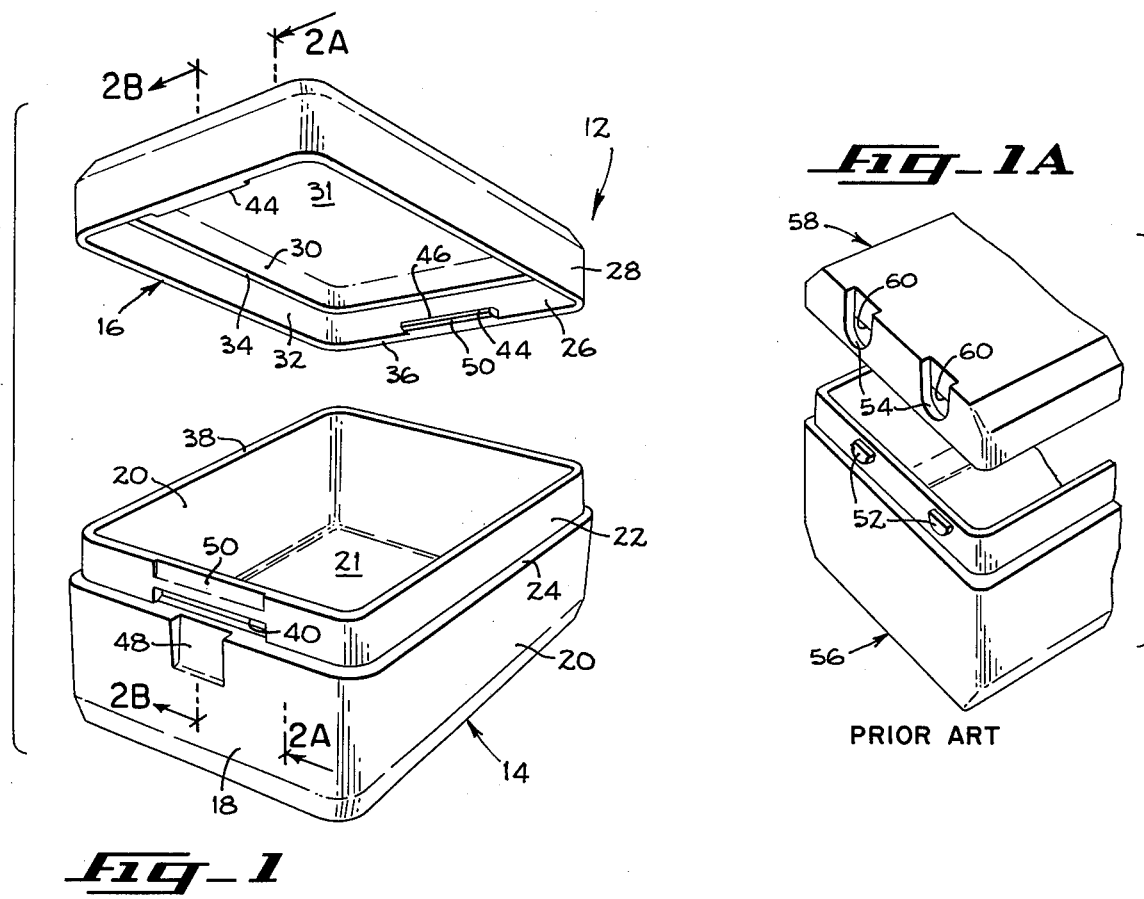

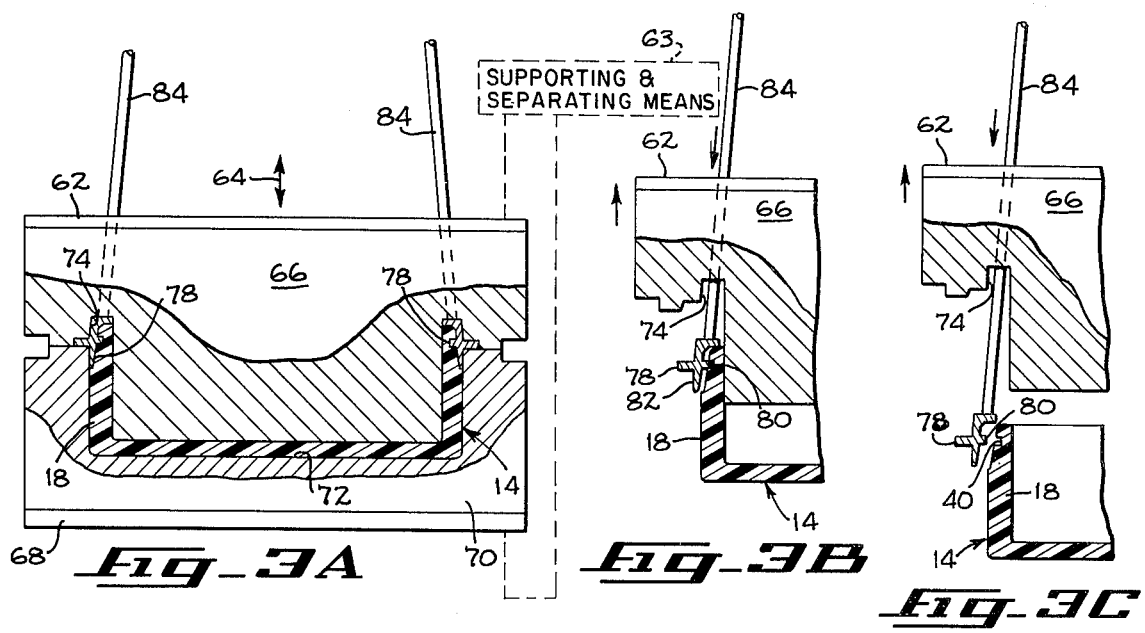
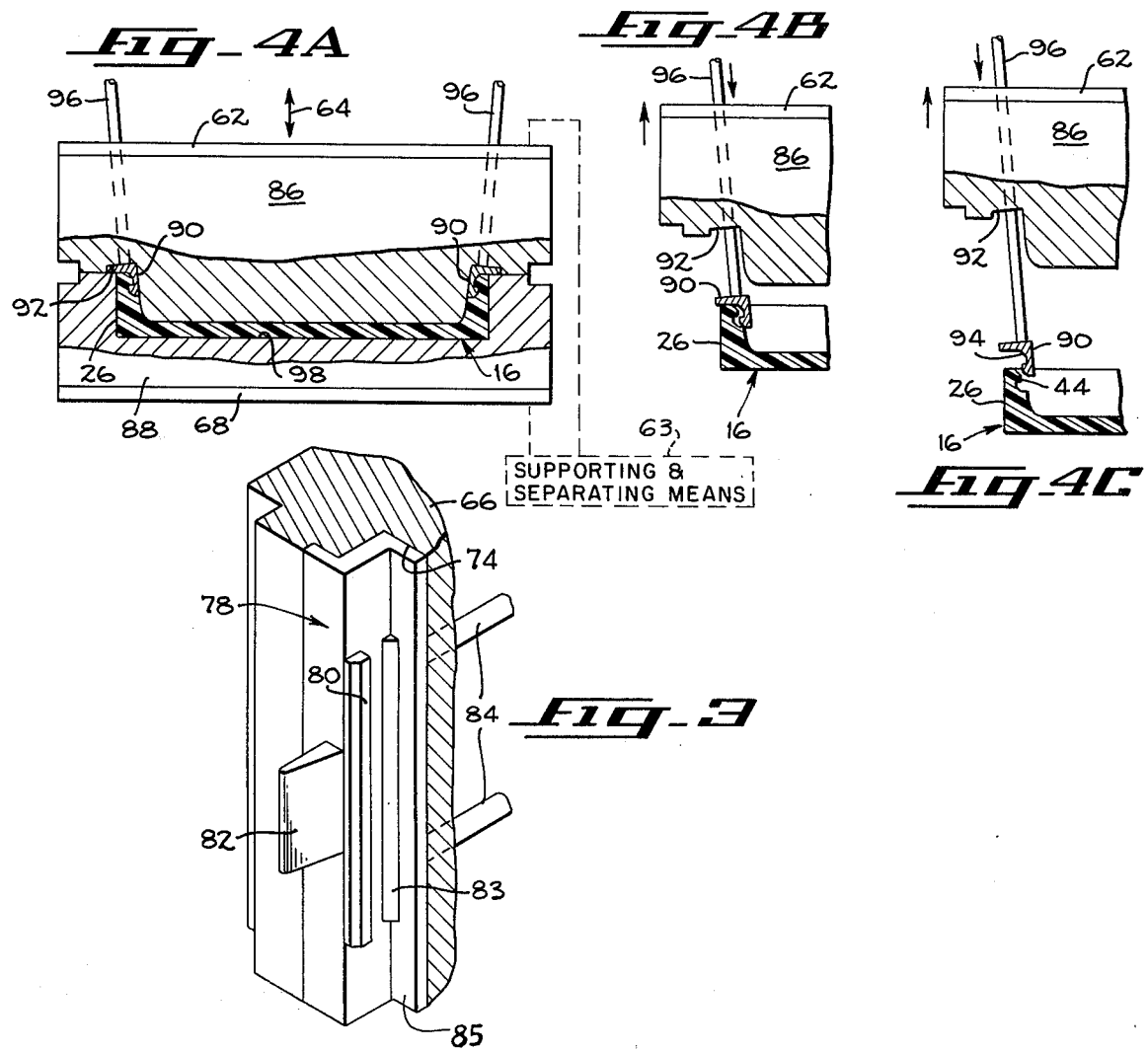

3,982,875

APPARATUS FOR MAKING MOLDED ARTICLES OF EXPANDED CELLULAR MATERIAL AND PRODUCT THEREOF

This is a continuation of application Ser. No. 510,289 filed Sept. 30, 1974, now abandoned.

BACKGROUND OF THE INVENTION

1. Field of the Invention

This invention relates to an improved article made of expanded cellular material such as expanded polystyrene and to an apparatus and method for molding the article.

2. Description of the Prior Art

Shipping containers constructed of expanded cellular material such as expanded polystyrene are disclosed in U.S. Pat. Nos. 3,331,529; 3,412,893; 3,424,341 and 3,489,314. U.S. Pat. No. 3,424,341, although disclosing a container having certain characteristics similar to the container disclosed hereinafter, fails to disclose a process and apparatus having the advantageous features of the present invention.

SUMMARY OF THE INVENTION

For shipping fragile articles, containers constructed of rigid cellular materials such as expanded polystyrene have gained wide acceptance because of the strength and light weight of such material. The parts of such containers are typically molded in molding apparatus in which there is a fixed grid on which female mold sections are fastened and a movable platen on which corresponding male mold sections are fastened. When the platen is moved toward the grid plural cavities corresponding to the shape of the parts to be molded are formed and when the platen is moved away from the grid the molded parts can be extracted. To maximize the production rate of such apparatus, it is desirable to provide the maximum number of mold sections that the apparatus will accommodate. The method and apparatus of the invention affords maximum capacity of the molding apparatus while providing for the formation of integral latching members which serve to keep the container in a closed condition.

The advantages of the method and apparatus of the invention can be appreciated by contrasting the invention with certain techniques employed heretofore. In one technique laterally moving mold parts that have the capability of forming integral latch parts are employed. The laterally moving mold parts are typically activated by solenoids and/or pneumatic or hydraulic cylinders which are mounted on the grid and/or platen. Because the laterally movable mold parts and their driving mechanisms occupy substantial area on the molding apparatus they materially reduce the capacity of the molding apparatus. Another prior art technique effects formation of latching mechanisms on rigid cellular molded articles by providing openings in the articles through which various mold parts can protrude to form the latching mechanisms. This prior art technique permits maximum utilization of the molding apparatus but produces containers which are weak, because they contain holes therein adjacent to latching parts, and the containers and latching mechanisms therefore fail prematurely because of the openings adjacent the latching members.

The principal object of the present invention is to provide a two piece shipping container constructed of rigid cellular material such as expanded polystyrene that has integral interengageable latching members in each half of the container which latching members are arranged so that the container can be opened and closed without breaking or otherwise destroying the parts of the container. This object is achieved by providing a container in which the cover and the base or box section have overlapping confronting surfaces and by forming in the surfaces complemental discontinuities, i.e. a concavity and a convexity, which engage one another when the container is in the closed position. The dimensions of the discontinuities are established with respect to the permissible deformation of the material so that engagement and disengagement between the discontinuities can be effected without destroying or impairing the strength of the rigid cellular material of which the container is constructed.

Another object is to provide apparatus for injection molding a container having the above noted characteristics. In achieving this object the present invention provides an improvement in molding apparatus of the type that has a male and a female mold section which are maintained in spaced relation to define therebetween a cavity having a shape corresponding to the container. Associated with the male mold section is one or more ejector bars which are activated after the mold sections are separated to eject the molded article from the male mold section. The ejector bars include surface discontinuities that are the mirror images of the discontinuities to be formed in the side walls of the molded article. According to the present invention, the ejector bars are moved along an oblique path so that the ejector bars simultaneously eject the article from the male mold section and move obliquely to release the ejector discontinuity from the complemental discontinuity formed in the wall of the molded article. The ejector bars are constrained for either diverging or converging oblique movement with respect to the path along which the mold sections are separated, depending on whether the discontinuity is to be formed on the outer or inner surface of the article.

Still another object of the present invention is to provide a method for molding discontinuities in molded rigid cellular articles and the method includes the steps of providing a complemental discontinuity on the ejector bar, filling the cavity between the mold sections with rigid cellular plastic material, curing the plastic material, separating the mold sections along a path, and then moving the ejector bar in a direction oblique of the path to effect separation of the article from the male mold section and to release the discontinuity on the ejector bar from the mirror image discontinuity in the molded article.

A feature and advantage of the present invention is that discontinuities in wall surfaces that extend generally parallel to the direction of mold separation can be formed without jeopardizing the integrity of the rigid cellular material during molding and during subsequent use.

The foregoing, together with other objects, features and advantages will be more apparent after referring to the following specification and accompanying drawings.

BRIEF DESCRIPTION OF THE DRAWING

FIG. 1 is a fragmentary exploded perspective view of a shipping container incorporating the latch system of the present invention.

FIG. 1A is a similar view of one prior art arrangement for providing an integral container latch.

FIG. 2A is a cross sectional view taken generally along lines A — A of FIG. 1.

FIG. 2B is a cross sectional view taken generally along lines B — B of FIG. 1.

FIG. 2C is a sectional view similar to FIG. 2B showing the latch in an engaged position for retaining the box of FIG. 1 in the closed condition.

FIG. 3 is a fragmentary perspective view of a male mold section having an ejector head configured for forming a discontinuity on the exterior wall surface of a molded article.

FIG. 3A is a simplified cross sectional view of molding apparatus incorporating the present invention for forming discontinuities on the exterior surface of an article.

FIGS. 3B and 3C are similar to FIG. 3A showing the mold at subsequent stages during the opening of the mold and ejection of the completed article.

FIG. 4A is a simplified cross sectional view of molding apparatus according to the present invention for molding a discontinuity on the inside surface of an article.

FIGS. 4B and 4C are views similar to FIG. 4A and showing subsequent steps in ejecting the article from the molding apparatus.

DESCRIPTION OF THE PREFERRED EMBODIMENT

Referring more particularly to the drawing, reference numeral 12 indicates a shipping container constructed according to the present invention. The container includes a lower box portion 14 and an upper cover portion 16. The container shown is useful for shipping fragile articles such as fresh fruits and vegetables and is constructed of substantially rigid cellular material such as expanded polystyrene or the like. Box portion 14 has end walls 18 from which extend side walls 20 and a bottom wall 21 in integral relation to the end wall. Extending upward from the end wall and the side walls and integral therewith is a lip 22 which has a thickness somewhat less than the thickness of walls 18 and 20 so as to define a shoulder 24 which circumscribes the perimeter of box portion 14.

Cover portion 16 has an end wall 26 from which integrally extend side walls 28 and 30 and a top wall 31 which correspond to the respective wall portions of box section 14. The end and side walls of cover portion 16 have at the outer extremity thereof a lip 32 which is of less thickness than the end and side walls so as to define an interior shoulder 34. Cover portion 16 has a peripheral edge 36 that engages shoulder 24 of box portion 14 when the lid is in place, and the box portion has a peripheral edge 38 which engages shoulder 34 of the cover portion.

Inward of peripheral edge 38 the outer surface of lip 22 is formed with a groove 40. Groove 40 defines a downward facing abutment surface 42 which extends generally normal to lip 22. The inner surface of lip 32 defines a projection 44 which is complemental in shape to groove 40 and defines an upward facing abutment surface 46 adapted to engage abutment surface 42 when cover portion 16 is in place on box portion 14. See FIG. 2C. As can be seen most clearly in FIG. 1, groove 40 has a length greater than the length of protrusion 44 so that the protrusion can positively enter the depression thereby affording engagement between abutment surfaces 42 and 46 to assure that the box is securely retained in a closed position.

A portion of shoulder 24 in end wall 18 of the box portion is excised as at 48 so as to afford finger access to edge surface 36 to facilitate opening the box. To facilitate closing the box, peripheral edges 36 and 38 define complemental chamfers 50 which perform a cam-like function to distort slightly lips 22 and 32 to permit closure of the container by affording engagement between cover portion 16 and box portion 14.

In one container designed according to the present invention, the area of engagement between abutment surfaces 42 and 46 and their counterparts on the opposite end of the container is about 1.88 square inches. By way of contrast a known prior art container latch (shown in FIG. 1A) has a surface area of contact equal to 0.54 square inches. The latter area is constituted by the lower surfaces of protruding buttons 52 and the upper surface of excisions 54 located respectively in a box portion 56 and a cover portion 58. Because of the relative small surface area of engagement the structure of FIG. 1A has proved extremely fragile, and because of prior art molding techniques, it is essential in forming surfaces 54 to provide an opening 60 adjacent the surface which materially weakens the cover portion of the box and promotes fracture of the cover portion that defines the opening. The present invention, by way of contrast, provides an extremely strong container that can be opened scores of times without adversely affecting the integrity and operability of the container and the latch structure.

In using the container shown in FIG. 1, the articles to be shipped are first placed in box portion 14 after which cover portion 16 is fitted on to the box portion with the inner surface of lip 32 disposed in confronting relation to the exterior surface of lip 22. Downward pressure of the cover portion causes lip 22 to deform inward and lip 32 to deform outward due to the camming action of chamfers 50. The protrusion 44 then snaps into groove 40 so that abutment surfaces 42 and 46 abut one another and retain the cover in place. When it is desired to remove the cover portion 16, lip 32 is distorted outward, lip 22 is distorted inward, and pressure is applied to peripheral edge 36 via excisions 48. When the deformation is sufficient for abutment surface 46 to clear abutment surface 42, the cover portion can be simply removed.

Because lips 22 and 32 have a thickness of between one-third and one-half that of the end wall portions of which they are part, there is sufficient material to deform without breaking. More particularly, the width of abutment surfaces 42 and 46 is selected so that the abutment surfaces can be disengaged by deforming the rigid cellular material of which the container is constructed by an amount within the elastic limit of the material. Because of this relationship, the container can be opened and closed many times for inspection and repacking without destroying the integrity of the container or the latching mechanism.

The apparatus for forming box section 14 is shown in FIG. 3A. The novel aspects of the present invention are incorporated in conventional low pressure molding apparatus which can take the form of a platten 62 which is supported by mechanism 63 for reciprocating movement along a linear path indicated by arrow 64. A male mold section 66 is secured on platen 62. Platten 62 moves along path 64 toward and away from a fixed grid structure 68 on which a female mold section 70 is secured. The apparatus has a mold section supporting means, which includes platen 62 and grid 68 and is adapted to support mold sections 66 and 70 in spaced apart relation to define therebetween a cavity 72 corresponding in shape to that of box section 14. At the edge of male mold section 66 corresponding to the location of end wall 18 the male mold section defines a recess 74; there is an ejector head 78 shaped complementally of the recess so as to fit therewithin when the mold sections are in the position shown in FIG. 3A. As can be seen in FIG. 3 and 3B, ejector head 78 has a protuberance 80 having a shape corresponding to the mirror image of groove 40 in box section 14. In the present specification and appended claims, the term "mirror image" is employed and is intended to mean that when it is desired to form a convexity, the ejector head has a complementally shaped concavity and vice versa. Ejector head 78 also has a portion 82 which is configured as a mirror image of excision 48 as well as fillet-like element 83 which is configured as a mirror image of chamfer 50 on box portion 14. As seen in FIG. 3, ejector head 78 has a normal surface 85 which is a surface that is generally perpendicular to the direction of path 64 along which the mold sections are moved to permit ejection of the molded article.

Ejector heads 78 are connected to ejector rods 84 which are constrained for axial movement along an axis disposed obliquely of the direction of path 64. In the apparatus of FIGS. 3 – 3C, wherein a depression is formed in the exterior wall of the molded article, rods 84 are constrained so that ejector heads 78 diverge from one another, and from the direction of path 64 when the ejector heads are moved away from male mold section 66 and platen 62. An angle of divergence of about 5° to linear path 64 has been found suitable in one apparatus designed according to the present invention which is useful for forming a groove 40 having a depth of about 3/16 inch. For discontinuities having a greater dimension in a direction normal to path 64 an angle in excess of 5° may well be necessary or desirable, so long as the ejector heads do not interfere with adjacent equipment during oblique movement thereof.

The operation of the apparatus shown in FIGS. 3A – 3C can be appreciated by first considering FIG. 3A wherein the platen 62 is moved to its maximum position toward grid structure 68 so as to close the cavity 72. At such position, ejector heads 78 reside in recesses 74 in the periphery of the male mold section and polystyrene beads or the like are injected in the cavity in accordance with conventional practice. Thereafter, steam or the like is applied so as to heat the beads and cause them to adhere to one another. After a suitable residence time for curing the injected beads (by cooling, for example), platen 62 is moved away from fixed grid structure 68 along path 64. This withdraws the completed article from female mold section 70. When the platen has been retracted to free the article from the female mold section, rods 84 are moved along their respective axes to eject the article from male mold section 66. See FIG. 3B. Movement of the rods 84 and ejector heads 78 continues, during which the ejector head moves outward from the article. Such outward movement occurs because of the diverging paths of movement on which rods 84 are constrained. Finally, see FIG. 3C, the ejector head is free of the mirror image discontinuities in box portion 14, whereupon the box portion is free to be released from the male mold section such as by gravity or by an air blast. Accordingly, the molded article can fall free and the apparatus can be restored to the position of FIGS. 3 and 3A preparatory to receiving an additional charge of cellular plastic material.

The ejector actuating rods 84 and their related equipment are substantially confined within an area aligned with that occupied by mold sections 66 and 70 in the molding apparatus. Accordingly, the present invention effects a substantial conservation of space, in consequence of which a greater capacity is possible on the same machine. This should be contrasted with certain prior art techniques, e.g. the technique employed in forming the container of FIG. 1A wherein there are mold portions that are moved laterally by means of hydraulic cylinders, electric solenoids or the like when ejection of a completed article occurs. The actuators for laterally moving the mold parts occupy substantial space on platen 62 thereby accommodating fewer molds on the same size platen as is possible with the present invention. For example, in one apparatus designed according to the present invention, it is possible to form one box section 14 and one cover section 16 side by side in the apparatus. Were it necessary to have laterally moveable mold parts and their actuators, the same apparatus would not have sufficient width to accommodate two articles in side by side relationship. Thus, in the particular example under discussion, the present invention has permitted doubling the capacity of the molding apparatus.

The apparatus for forming protrusion 44 on cover portion 16 is shown in FIGS. 4A – 4C. A male mold section 86 is secured to platen 62 and a female mold section 88 is secured to grid structure 68. An ejector bar 90 is provided, male mold section 86 having a recess 92 that is complementally shaped with respect to the ejector head so that the ejector head forms a part of the male mold in the position shown in FIG. 4A. Ejector bar 90 has a depression 94 which is the mirror image of protrusion 44 in cover portion 16. Ejector bar 90 is fixed to the end of a pair of reciprocable actuating rods, one of which is shown at 96. The rods are constrained for movement on a path that is oblique to the direction of path 64. In forming surface discontinuities on the inner surface of an article, the path along which rods 96 are constrained is such that ejector heads 90 converge toward one another when the ejector heads are moved outward of male mold section 86.

In operation, the embodiment of the invention shown in FIGS. 4A – 4C operates by first positioning male mold section 86 in spaced relation to female mold section 88 to define a cavity 98 therebetween, which cavity has a shape corresponding to the shape of cover section 16. The polystyrene beads or the like are introduced into the cavity and heat treated and cured as described above. Thereafter, platen 62 and male mold section 86 are moved away from female mold section 88 along path 64 so as to free the molded article from female mold section 88. See FIG. 4B. Ejector rods 96 are moved outward to effect a corresponding movement of ejector heads 90, the movement occurring along a converging path. When the movement of the ejector heads is sufficient to move the ejector heads out of engagement with the corresponding discontinuities formed in the wall of cover portion 16, the cover portion 16 is free to be released via gravity, air pressure or the like. Thereafter, ejector heads 90 are withdrawn into recesses 92 and male mold section 86 is brought into fixed spaced relation of female mold section 88 to define cavity 98 and permit a further cycle of operation.

The present invention is described in connection with a shipping container only by way of example, and not by way of limitation. It will be appreciated by those skilled in the art that the present invention can be employed in molding virtually any rigid cellular article wherein the material has insufficient elasticity to permit the molded article to be snapped from fixed mold parts. Because the molded part is not stressed during ejection, no extension in the molding cycle time is necessary in practicing the invention. Stated otherwise, the method, apparatus and article of the invention are suitable for forming discontinuities that have a dimension in a direction normal to path 64 which is at least as great as the amount of which the molded material is capable of deforming without exceeding the elastic limit of the material.

Thus it will be seen that the present invention provides an improved article as well as an apparatus and method for constructing the article. The apparatus and method permit the use of existing machinery at a capacity substantially in excess of the capacity possible by known prior art techniques. Moreover, the surface discontinuities in the side walls, i.e. the walls that extend generally parallel to the direction of the path 64, can be quickly and conveniently formed without in any way overstressing or jeopardizing the integrity of the molded material.

Although several embodiments of the invention have been shown and described, it will be obvious that other adaptations and modifications can be made without departing from the true spirit and scope of the invention.

I claim:

1. In apparatus for molding a part wherein the apparatus is of the class having a male mold section, a female mold section shaped complementary to the male mold section, and means for supporting said mold sections in a first position defining therebetween a cavity having a shape corresponding to the part to be formed, said supporting means including means for separating said sections from one another along a path to a second position, and wherein said part has diametrically opposite wall portions extending in a direction generally parallel to the path, the improvement comprising first and second ejector heads, portions of said male mold section adjacent respective said wall portions defining first and second recesses complementally shaped to receive respective said ejector heads, said ejector heads each having a surface portion flush with and bounding a portion of said cavity when the ejector head is received in a respective said recess, said surface portions being oriented perpendicular to said path so that upon movement of said ejector heads out of said recesses said surface portions bear on and slide transversely along corresponding surfaces of the part to eject the part from the male mold, said ejector heads each being operable to eject a part from said male mold section and having an elongate surface discontinuity shaped to form a corresponding mirror image discontinuity in respective said wall portions of said part, said surface discontinuities being less extensive than and spaced from said surface portions to avoid overstressing the portions of the part adjacent the corresponding mirror image therein, and means including first and second rigid rod pairs operable in the second position for moving respective said ejector heads away from said male mold section to eject said part therefrom, the rods in said pairs being fixed at spaced apart points to respective said ejector heads remote from said surface portions and surface discontinuities, said ejector moving means being simultaneously operable to move said ejector heads outwardly away from said male mold section and in respective straight line directions acutely oblique of said path so as to retract laterally respective said ejector discontinuities from corresponding mirror image discontinuities in said wall portions of said part, the individual rods in said pairs moving in unison to avoid relative angular movement between the surface discontinuities on said ejector heads and the corresponding mirror image discontinuities on said part.

2. Apparatus according to claim 1 wherein said oblique direction is about 5° from said path.

3. Apparatus according to claim 1 for molding a surface discontinuity on the exterior surface of the wall part comprising the surface discontinuity of said ejector head being disposed on the inner surface thereof, said recess being disposed to position said ejector discontinuity proximate the exterior surface of said cavity, and wherein said ejector head moving means includes a rigid rod having one axial end operatively connected to said ejector head, means for constraining said rod for axial movement along an axis diverging outward of the path of said separating means and means for moving said rod axially outward along said diverging axis to effect corresponding movement of said ejector head.

4. Apparatus according to claim 3 wherein said ejector head discontinuity includes a convexity for forming a mirror image concavity in the exterior surface of the wall of the part.

5. Apparatus according to claim 1 for molding a surface discontinuity on the interior surface of the wall part comprising the surface discontinuity of said ejector head being disposed on the outer surface thereof, said recess being disposed to position said ejector discontinuity proximate the interior surface of said cavity, and wherein said ejector head moving means includes a rigid rod having one axial end operatively connected to said ejector head, means for constraining said rod for axial movement along an axis converging inward of the path of said separating means and means for moving said rod axially outward along said converging axis to effect corresponding movement of said ejector head.

6. Apparatus according to claim 5 wherein said ejector head discontinuity includes a concavity for forming a mirror image convexity in the interior surface of the wall of the part.

7. Apparatus according to claim 1 for forming said discontinuities on the exterior surface of said wall portions wherein said ejector head discontinuities are disposed on respective inner surfaces thereof, said recesses being disposed to position said ejector discontinuity proximate the exterior surface of said cavity and wherein said ejector moving means comprise means for constraining said ejectors for movement outward of respective said recesses in directions diverging laterally of said path.

8. Apparatus according to claim 1 for forming said discontinuities on the interior surface of said wall portions wherein said ejector head discontinuities are disposed on respective outer surfaces thereof, said recesses being disposed to position said ejector discontinuity proximate the interior surface of said cavity and wherein said ejector moving means comprise means for constraining said ejectors for movement inward of respective said recesses in directions converging laterally of said path.

9. In molding apparatus of the type having a male mold section and a female mold section complemental to the male mold section and configured to form in cooperation with the male mold section a cavity for molding an article, said mold sections defining outward of said cavity planar mating surfaces, said female mold section being movable away from said male mold section in a direction normal to the plane of said mating surfaces to open the cavity and to afford ejection of a molded article, said cavity having first and second opposite elongate wall portions substantially normal to the plane of said mating surface to form a corresponding elongate wall portion on the molded article, the improvement comprising first and second ejectors, said male mold section defining first and second recesses complementally shaped to receive respective said ejectors, said recesses communicating with the mating surface of said male mold section adjacent respective said cavity wall portions, each said ejector having a normal surface substantially flush with said mating surface and a side surface generally parallel to the respective cavity wall portion, each said ejector side surface having a surface discontinuity in communication with said cavity for forming a mirror image discontinuity on the respective wall portion of said article, and means for moving said ejectors out of respective said recesses in a direction oblique of said normal direction and away from the mirror image discontinuities in respective walls of the article, said ejector normal surface acting to eject the article from said male mold member, said ejector moving means being connected at spaced portions to said ejector for confining said ejector in substantial parallelism to the plane of said mating surfaces.

10. Molding apparatus according to claim 9 wherein said ejector moving means comprises first and second mutually parallel spaced apart bores communicating with said recesses, said bores being oriented in parallelism with said oblique direction, first and second rods disposed in said bores for sliding movement therein, said rods each having an axial end rigidly fixed to said ejector remote from said surface discontinuity so as to constrain said ejector for movement in said oblique direction.

\* \* \* \* \*